United States Patent [19]

Finnell

[11] Patent Number: 4,530,439
[45] Date of Patent: Jul. 23, 1985

[54] THERMOS BOTTLE CAP DOUBLES AS A CUP

[76] Inventor: Reuben Finnell, 898 Brittain Rd., Akron, Ohio 44305

[21] Appl. No.: 653,895

[22] Filed: Sep. 24, 1984

[51] Int. Cl.³ .............................................. B65D 41/26
[52] U.S. Cl. ............................ 220/90.4; 215/DIG. 7
[58] Field of Search ................. 220/90.4, 23.83, 23.86; 215/DIG. 7

[56] References Cited

U.S. PATENT DOCUMENTS

| | | | |
|---|---|---|---|
| 2,534,614 | 12/1950 | Michael | 220/90.4 |
| 3,017,047 | 1/1962 | Payson et al. | 215/DIG. 7 |
| 4,441,624 | 4/1984 | Sokolowski | 220/90.4 X |

FOREIGN PATENT DOCUMENTS 1029516  3/1953  France ................................. 220/90.4

Primary Examiner—Steven M. Pollard
Attorney, Agent, or Firm—R. S. Pauliukonis

[57] ABSTRACT

A thermos bottle cap that doubles as a cup also includes a cup lid adaptable of cup sealing against spillage of the contents such as coffee or other fluids housed therein during cup transport while permitting liquid dispensing enroute from the cup via one of the openings provided therein while the other opening serves as a vent, including cup storage means in a special retainer that may be sealably secured to a top of any surface to prevent cup sliding with liquid slashing, and in congregation the cup, the lid and the retainer permitting novel and effective utilization of prior art components for new and useful synergetic results.

4 Claims, 3 Drawing Figures

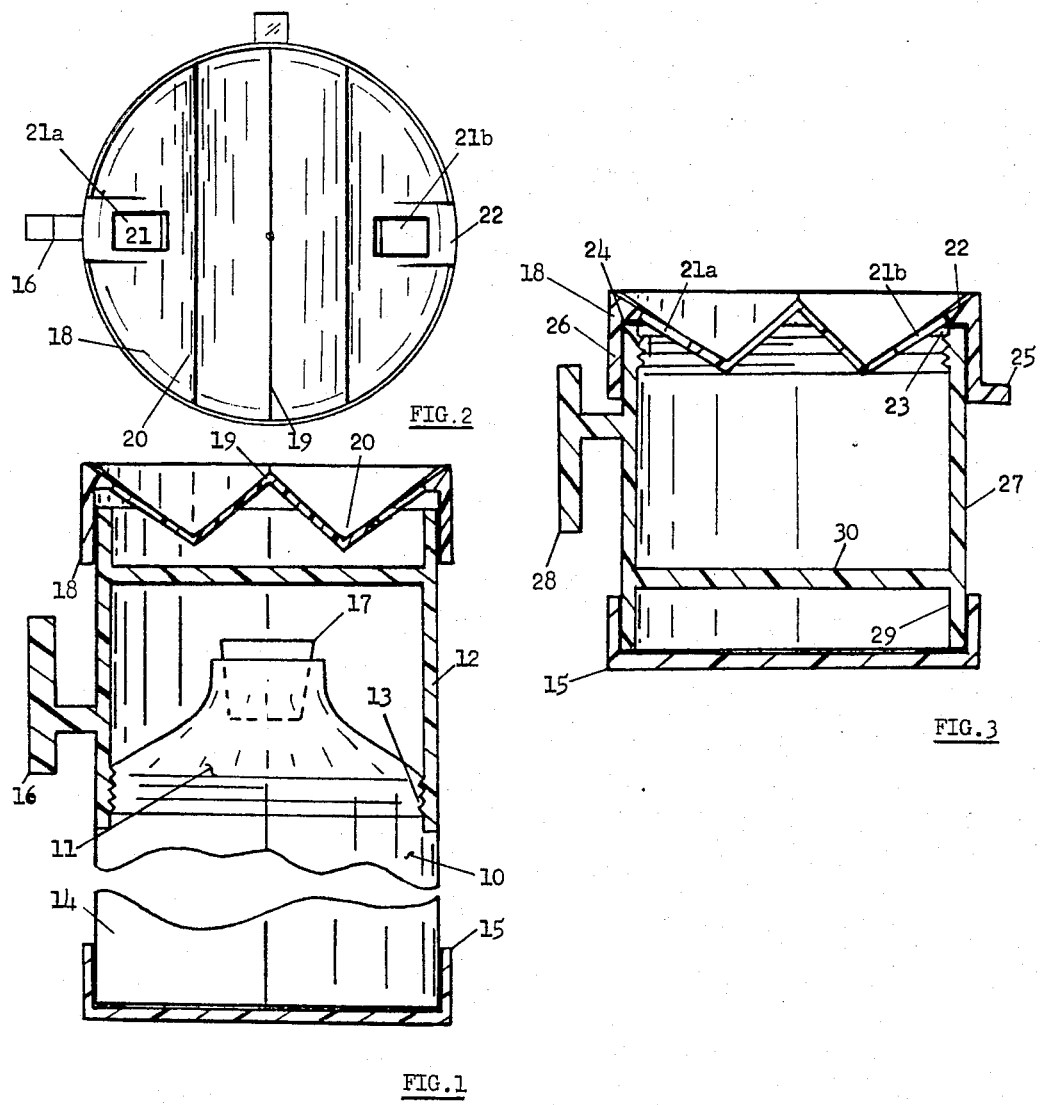

THERMOS BOTTLE CAP DOUBLES AS A CUP

FIELD OF THE INVENTION

This invention relates to thermos bottle caps in general and to a simple cap that doubles as a cup adaptable of receiving aqueous contents such as beverage or coffee to be consumed by drinking through an opening of a lid incorporated therein in particular.

BACKGROUND OF THE INVENTION

The use of thermos bottles for housing aqueous solutions such as coffee or beverages is an accomplished fact. The use of a cap that doubles as a cup is a rare commodity. The U.S. Pat. No. 2,954,888 issued Oct. 4, 1980 to C. Bramming identifies a plastic jacketed vacuum bottle for improved construction to house disposable fluids and includes a cap of unspecified design. In fact, Bramming states in lines 11–13 of column 2 "Since the stopper and cap form no part of the present invention, it will suffice to state that these elements may be conventional in structure." Further, after a patent search with a study of the conventional structure of various vacuum and thermos bottle caps, it has been determined that the state of the art is very limited. Likewise, the utility of such caps in terms of functional use thereof is also very limited, except for a variety of conceptual designs in beverage container lids for control of spillage of liquids housed in the cups.

The U.S. Pat. No. 4,319,691 issued Mar. 16, 1982 to E. Hament shows a rather complicated cup lid fitting the lip thereof and provided with a liquid dispensing opening in a second of the circular flanges, while U.S. Pat. No. 4,106,660 issued Aug. 15, 1978 to P. Boyle ralates to a splash proof drink-through beverage container lid which is even more complicated in the design and operation thereof.

Since no prior art caps offer improvements found in the present invention which includes a cap that doubles as a cup and is capable to function with a novel lid so as to allow liquid dispensing therefrom without spillage, the objectives become quite apparent, indeed.

It is therefore an object of the present invention to provide a simple new thermos bottle cap that doubles as a cup.

A more specific object of the present invention is to provide thermos bottle cup which also includes a novel lid for splash protection and for liquid dispensing via dual lid opening incorporated therein.

Another object of the present invention is to provide a simple cup retainer for control of cup sliding, in particular during traveling.

A final object of the present invention is to provide novel means for cap utilization in a plurality of functions be it a closure means for thermos bottles or a stationary or portable cup that contains a special lid for control of liquid spillage and for liquid withdrawal therefrom when in transit, all of which can be done by congregation of best features from prior art elements structured for new and synergistic result.

These and other objects and advantages of the invention will be apparent from the following specification and drawings identifying certain typical embodiments thereof.

SUMMARY OF THE INVENTION

A thermos bottle cap that doubles as a cup incorporates an open mouth provided with internal mating threads to serve as closure means for vacuum bottles of the type wherein a double walled evacuated glass bottle adaptable of receiving liquids either hot or cold keeps the contents stored at a desired temperature for an extended period of time. The cap of the present invention may be provided with a handle so that when it gets unscrewed from the thermos bottle it becomes a cup of conventional appearance and utility. When filled with liquids ordinarily the cup is subject to spillage. Therefore, said open mouth of the cup receives a special lid to control liquid splash with spillage as well as to allow liquid withdrawal by way of one of the two lid openings allowing an easy dispensing of the contents while another of the lid openings serves as a vent. The dual liquid withdrawal lid openings entail great improvements in utilization of the cup during travels in that the user needs little hunting to find appropriate opening for dispensing liquid therefrom, a step often difficult to perform when operating a motor car with one hand while the other is used for handling said cup to quench a thirst. A cup retainer adaptable of being spaced and secured permanently by the user on a dashboard or the like further increased the utility of the cup of the present invention.

The cup, the lid and the retainer initially can be assembled onto the thermos bottle wherein the cup serves as a vacuum bottle cap adaptable of receiving on its back frictionally snugged-over lid until said lid is placed over said open mouth of said cup in service while the retainer ring may be snugged over the bottom end of the thermos bottle frictionally until it becomes removed for securing permanently in a designated space within the compounds be it a motor car or a diesel engine of a train, or the like.

BRIEF DESCRIPTION OF THE DRAWINGS

FIG. 1 is a side view of a preferred embodiment showing in cross section a cap secured to a thermos bottle by threads and a lid stored atop thereof while a retainer ring is placed at the bottom of the thermos bottle;

FIG. 2 is a top view of FIG. 1 illustrating liquid dispensing openings in the lid;

FIG. 3 is a cross section of a cap that doubles as a cup with the lid on the top and the retainer ring on the bottom of the cup.

DETAILED DESCRIPTION OF THE DRAWINGS

FIG. 1 embodiment identifies an assembly of an elongated thermos bottle 10 that is sectioned to illustrate more clearly a first top end 11 which is closed by a cap 12 by way of mating threads 13 and a second bottom end 14 which is provided with a retainer ring 15 loosely secured thereto by friction. Cap 12 is essence is an inverted cup which includes a handle 16 to serve as a liquid container when unscrewed from the thermos bottle 10 thereby doubling as a cup in use. Since the thermos bottle 10 shown with a stopper 17 forms no part of the invention, it will suffice to state that these elements may be conventional in structure. A lid 18 adaptable of cap sealing against spillage of the contents housed inside the cap when in service is shown in FIG. 3 and also in FIG. 1 and FIG. 2 in a greater detail, covering the bottom of the inverted cap 12. However, the inside diameter of the lid is sized so as to cover cap 12 snugly by way of frictional interference between the outside of the cap 12 and the inside diameter of lid 18, both of which are shown in FIG. 1 and FIG. 3 in section representing plastic.

In FIG. 1 and FIG. 2 lid 18 is shown in a form of corrugation which includes a center ridge 19 dividing the lid 18 into two separate identical grooves 20 each containing identical opening 21 for liquid dispensing from cap 12 by way of sipping which includes cap tilting sideways in order to get liquid out via a first opening 21a while a second opening 21b serves as a vent. Since the location of openings 21 is shown to be adjacent edges on upward slope of the corrugation, a surface relief 22 made within the opening proximity is believed to enhence sipping process further but may not be limited thereto because the liquid dispensing process may materialize with success irrespective of edge preparation indicated. To note is the fact, however, that the location of handle 16 of FIGS. 1 and 2 relative to lid 18 position shown is incidental. In service, lid 18 may be rotated so as to be 90 degrees or so away from handle 16 for best results in sipping.

The same pertains to FIG. 3 drawing identifying cup 27 with handle 28 covered by lid 18. Lid 18 covering cup 27 so as to prevent spillage of the contents, in particular when in transit, can be placed inside retainer ring 15 comprising a conventional cup in appearance and utility. Cup retainer ring 15 may be spaced on any flat surface and secured thereto by way of adhesive or any other sealing means to prevent cup sliding with splashing and eventual liquid spillage.

Note that the lid 18 is placed over an open mouth 23 of the cup 27 externally and secured therein by frictional engagement with outside diameter of the cup until bottomed over the rim 24. The lid 18 may be removed for refill by pressing over a removal tab 25 which may be located in any position along the edge or a flange 26 of the lid 18.

Since cap 12 of FIG. 1 and cup 27 of FIG. 3 are the same identical components, it can be stated without hesitation that the cap of thermos bottle doubles as a cup when used separately or in conjunction with vacuum bottles of this general type.

Further, it can be deduced from the foregoing description that the lid 18 may be alternately used by storing it per FIG. 1 at the top of cap 12 which in FIG. 3 represents the bottom of cup 27 covered by retainer ring 15 or by placing lid 18 to close the open mouth 23 of the cup 27 per FIG. 3. Although cup 27 is shown with a skirt 29 extending cup bottom end wall 30, in practice such cups may be produced by lowering end wall 30 down to eliminate skirt 29 altogether if desired to increase the volumetric capacity of the cup 27.

While the invention is described in detail, it is obvious that modifications may be made by those skilled in the art without departure from the spirit and scope of the invention.

What is claimed is:

1. In a thermos bottle the improvements comprising:
   a cap recessed deep enough to form a fluid cavity therein terminates with an end wall at a first blind end thereof while a second opposite end is open comprising a mouth which is threaded and adaptable of closing a top end of said thermos bottle,
   a lid with dual liquid withdrawal openings spaced in opposite directions adjacent perimeter thereof and adaptable of closing said open mouth end of said cap for sealing control against liquid spillage enroute while allowing liquid dispensing therefrom via a first opening while a second opening serves as a vent,
   said cap when removed from said thermos bottle doubles as a cup adaptable of receiving liquid in said fluid cavity via said open mouth thereof and of being closed by said lid so as to allow subsequent liquid sipping therefrom via either of said lid openings, a retainer ring of a size that permits storage of said cup when not used to prevent cup slippage with liquid slashing including means for securing said retainer ring to a flat surface.

2. Thermos bottle improvements as in claim 1 wherein said lid includes a corrugated structure of which a central ridge divides said lid into two separate grooves each of which includes said liquid withdrawal opening, including a circular flange surrounding said corrugations of a size that permits lid mounting over the ends of said cap frictionally for control of liquid slashing, including a tab external to said flange for lid removal from said ends of said cap.

3. Thermos bottle improvements as in claim 1 wherein said cap includes a skirt protruding said end wall having an outside diameter that is adaptable of receiving said lid for storage.

4. In a thermos bottle the improvements comprising:
   a cup shaped bottle cap adaptable of containing liquids when removed from said thermos bottle, said cap further serving as a cup,
   a drinking lid adaptable of frictional cup closing and for fluid withdrawal from said cup via openings provided therein in the top thereof which is formed and provided with separate liquid grooves each containing one of said openings therein, including a circular flange attached thereto a retainer ring for cup holding to prevent slushing of the fluid stored inside said cup, said retainer ring adaptable of being secured to a flat surface by way of adhesive to prevent sliding,
   said drinking lid and said retainer ring including said bottle cap comprising an assembly of said thermos bottle until said cap becomes removed therefrom to serve as cup, and thereafter said drinking lid and said retainer ring comprising an assembly of said bottle cap that doubles as said cup adaptable of liquid supply from said thermos bottle and liquid storage therein with subsequent withdrawal therefrom selectively by way of said openings in said lid so as to permit liquid sipping from a first of said openings while a second opposite opening serves as a vent, or vice-versa.

* * * * *